(12) United States Patent
McConnell

(10) Patent No.: US 8,167,969 B2
(45) Date of Patent: May 1, 2012

(54) SNAPBAND FILTER DESIGN FOR HORIZONTAL BOTTOM ACCESS COLLECTOR

(75) Inventor: Larry Dale McConnell, Lees Summit, MO (US)

(73) Assignee: General Electric Company, Schenectady, NY (US)

(*) Notice: Subject to any disclaimer, the term of this patent is extended or adjusted under 35 U.S.C. 154(b) by 549 days.

(21) Appl. No.: 12/419,741

(22) Filed: Apr. 7, 2009

(65) Prior Publication Data

US 2010/0251675 A1    Oct. 7, 2010

(51) Int. Cl.
*B01D 50/00*   (2006.01)

(52) U.S. Cl. ............... 55/484; 55/308; 55/357; 55/491; 55/492; 55/493; 55/497; 55/498; 55/502; 55/504; 55/511

(58) Field of Classification Search ............ 55/484, 55/308, 357, 491, 492, 493, 497, 498, 502, 55/504, 510, 511
See application file for complete search history.

(56) References Cited

U.S. PATENT DOCUMENTS

| | | | |
|---|---|---|---|
| 4,415,343 A | 11/1983 | Margraf | |
| 5,632,791 A | 5/1997 | Oussoren et al. | |
| 5,660,608 A | 8/1997 | Bartholome | |
| 5,746,792 A | 5/1998 | Clements et al. | |
| 6,726,735 B1 | 4/2004 | Oussoren et al. | |
| 6,858,052 B2 | 2/2005 | Clements | |
| 7,186,284 B2 | 3/2007 | Clements | |
| 2005/0178097 A1 | 8/2005 | Clements | |
| 2007/0245703 A1* | 10/2007 | Randinelli et al. | ............ 55/528 |

FOREIGN PATENT DOCUMENTS

| | | |
|---|---|---|
| DE | 7808090 | 7/1978 |
| DE | 3127926 | 1/1983 |
| EP | 1563890 | 8/2005 |
| FR | 2407731 | 6/1979 |

OTHER PUBLICATIONS

European Search Report dated May 12, 2010 for Application No. EP 10157272 (2 pages).

* cited by examiner

*Primary Examiner* — Jason M Greene
*Assistant Examiner* — Dung H Bui
(74) *Attorney, Agent, or Firm* — Nixon & Vanderhye, P.C.

(57) ABSTRACT

A horizontal dust collector includes a plurality of elongated filter elements in a horizontally-oriented array, each filter element connected at one end to a tube sheet, and at an opposite end to a support plate. The one end of each filter element is fitted with a substantially rigid coupler having an insertion portion, a peripheral, outwardly facing groove adopted to receive a mating edge defining an aperture in the tube sheet, and a radially outwardly extending flange axially behind the annular groove for engagement with a filter element assembly tool. A tool is also provided to facilitate installation of the filter elements within the dust collector.

13 Claims, 3 Drawing Sheets

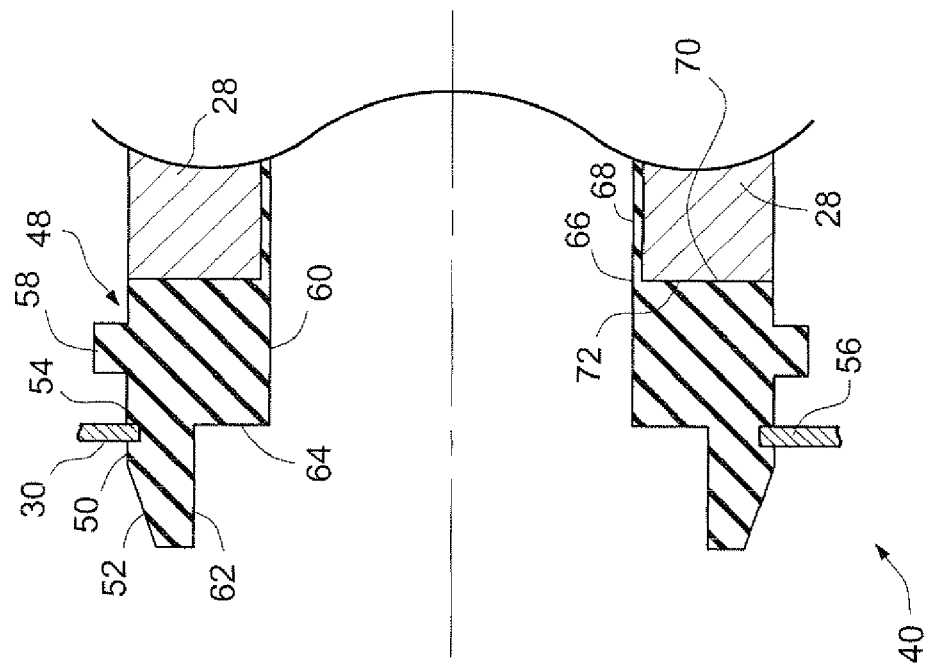
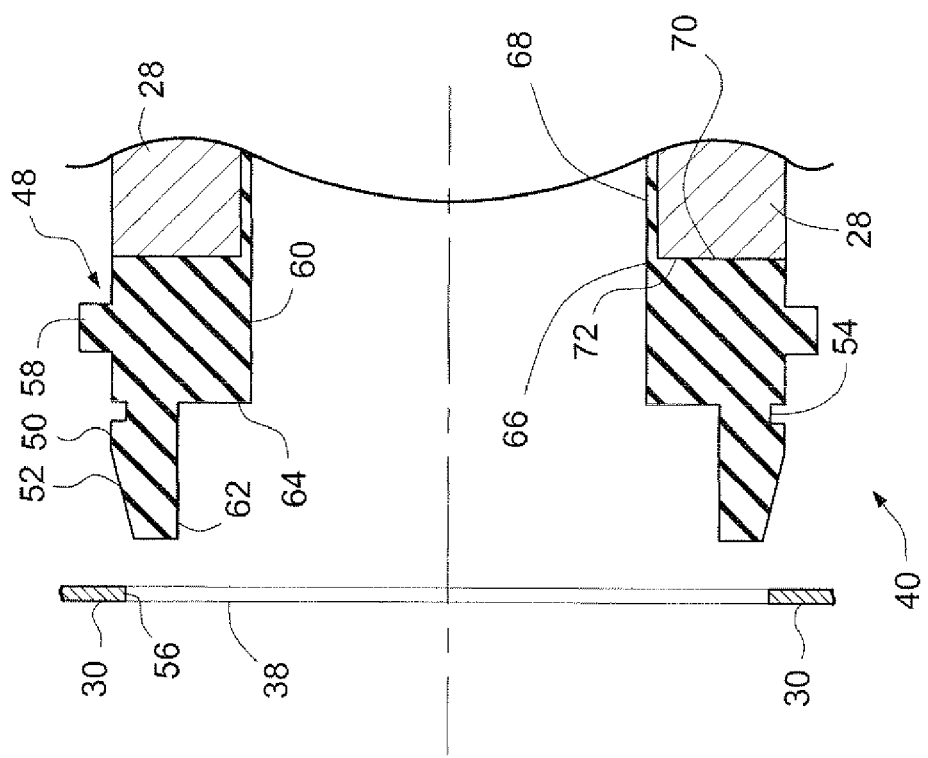

SNAPBAND FILTER DESIGN FOR HORIZONTAL BOTTOM ACCESS COLLECTOR

BACKGROUND OF THE INVENTION

This invention relates generally to a known dust collector construction and, more specifically, to a snapband-type coupler or connection attached to one end of an elongated pleated filter element used in the dust collector.

In prior horizontal dust collector designs, the requirement to attach elongated pleated filters to a tube sheet has been achieved through the use of a filter with a molded top that attached to a retaining cup on the bottom side of the tube sheet. The attachment of the filter to the cup is accomplished by first slipping the molded top of the filter over the cup. A clamp is then placed around molded filter top and is tightened to rigidly attach and seal the filter to the retaining cup of the tube sheet.

The above clamping arrangement is problematic in the assembly of horizontally oriented filter elements that have limited access to those ends of the filter elements that are joined to the tube sheet. There remains a need, therefore, for a filter element coupling or connector that is easily attached to a tube sheet from outside the dust collector housing despite limited access to the tube sheet.

BRIEF SUMMARY OF THE INVENTION

In one exemplary but non-limiting aspect, the present invention relates to a horizontal dust collector comprising a plurality of elongated filter elements in a horizontally-oriented array, each filter element connected at one end to a tube sheet, and at an opposite end to a support plate; the one end of each filter element fitted with a substantially rigid coupler having an insertion portion, a peripheral, outwardly facing groove adapted to receive a mating edge defining an aperture in the tube sheet, and a radially outwardly extending flange axially behind the annular groove for engagement with a filter element assembly tool.

In another exemplary but nonlimiting aspect, the invention relates to a filter element coupler and installation tool for a horizontal dust collector comprising: a coupler ring mounted on one end of an elongated, substantially cylindrical filter element, the coupler ring having an insertion portion; a peripheral, outwardly facing groove adapted to receive a mating edge defining an aperture in a tube sheet, and a radially outwardly extending flange axially behind the annular groove; the installation tool comprising an elongated handle and a substantially U-shaped clevis at a working end of the handle, the clevis sized to engage opposite sides of said outwardly facing groove.

In still another exemplary but nonlimiting aspect, the invention relates to an installation tool for inserting one end of an elongated cylindrical filter element into an aperture in a tube sheet, the tool comprising an elongated handle and a substantially U-shaped clevis at a working end of said handle. The invention will now be described in greater detail in connection with the drawings identified below.

BRIEF DESCRIPTION OF THE DRAWINGS

FIG. 2 is an enlarged detail, in cross-section, illustrating the snapband-type coupler in close proximity to an aperture in the tube sheet in which the filter element will be inserted;

FIG. 3 is an enlarged detail similar to that shown in FIG. 2, but with the snapband type connector or coupler fully inserted within the tube sheet;

DETAILED DESCRIPTION OF THE DRAWINGS

Figure 1:
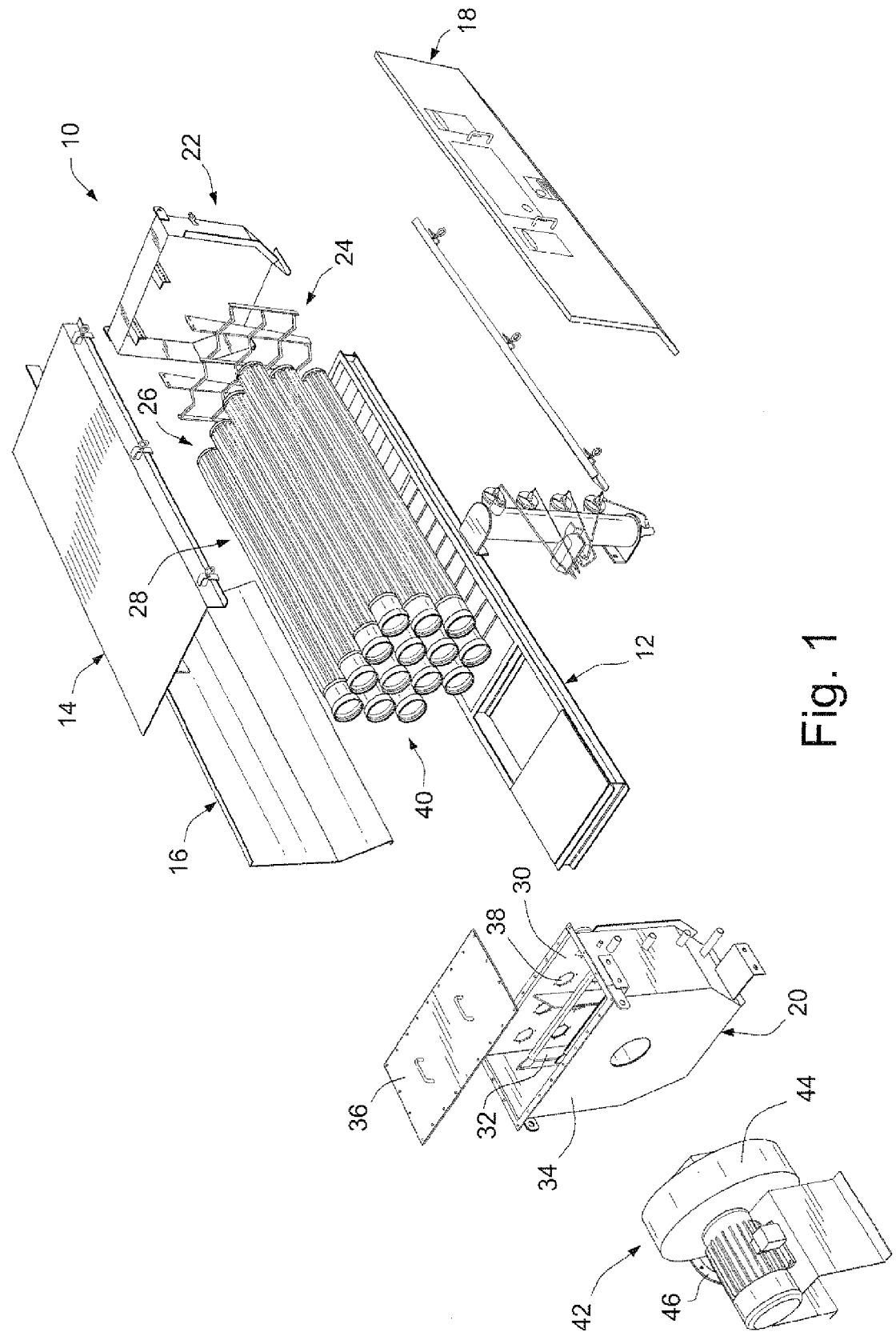
FIG. 1 is an exploded view of a horizontal dust collector utilizing a plurality of elongated filter elements, each fitted with a snapband-type connector or coupler in accordance with an exemplary but non-limiting embodiment of the invention.

With reference to FIG. 1, a horizontal dust collector 10 is shown in exploded form for ease of understanding, particularly with respect to the location and orientation of the filter elements within the dust collector. The collector 10 includes a housing that is comprised of an at least partially open bottom wall or panel 12, a closed top wall or panel 14, a pair of side walls or panels 16, 18, and opposite end wall assemblies 20, 22. A filter support plate or grid 24 is secured to the end wall 22 and serves to support first ends 26 of a plurality of elongated filter elements 28 described in greater detail below. The opposite end wall assembly 20 comprises a hollow body defined by an inner tube sheet 30, an intermediate wall 32 and an exterior wall 34. The end wall assembly 20 is closed by a removable top panel 36 and a fixed or removable bottom panel, not shown.

Apertures 38 in the tube sheet 26 support second ends 40 of the elongated filter elements 28 as described further herein. A fan unit 42 is attached to the exterior wall 34 of the end wall assembly 20 and, in use, draws air and dust from, for example, a conveyor belt carrying particulate material below but in proximity to the open portion of the bottom wall or panel 12, into the dust collector and then into the filter elements 28. Filtered air is drawn through the ends 40 of the filter elements 28 and is discharged via fan plenum 44 and outlet 46. It will be understood that the dust collector construction per se, as described above, is well known and forms no part of the invention. Of particular significance, however, is the connection between the ends 40 of the filter elements 28 and the tube sheet 30.

Installation of the filter elements 28 is carried out by removing (or pivoting to an open position) the side wall or panel 18 of the dust collector housing. The first ends 26 of the filter elements are supported on the grid or support plate 24 and the opposite ends 40 are received within the apertures 38 in the tube sheet 30 as described below.

Turning to FIGS. 2 and 3, an aperture 38 is shown in the tube sheet wall 30 and ready to receive an end 40 of a filter element 28. The filter element itself may be of a known, pleated construction, having a substantially hollow, elongated shape. In accordance with the exemplary but nonlimiting implementation of the invention, a molded ring 48 (which may be constructed of, for example, a relatively hard rubber or other equivalent suitable material) is secured by any suitable means to the end 40 of the filter element. The molded ring 48 (also sometimes referred to as a coupler ring) is substantially cylindrical in shape, with an outer surface 50 that is tapered at the lead or insertion-end portion 52 to facilitate pushing the ring 48 into the aperture 38. An outwardly facing annular groove 54 is formed in surface 50, adjacent and axially behind the tapered end portion 52. The groove 54 is sized to receive the edge 56 of the tube sheet that defines the aperture 38. Adjacent and axially behind the groove 54 is a radially outwardly extending flange 58, designed to interact with a tool (described below) for inserting the filter end 40 into the tube sheet 30.

The inside of the molded ring has an inner cylindrical surface 60 of a first internal diameter, and a counter-bored cylindrical surface 62 of a second and larger diameter. The surface 62 extends axially from the lead end of the molded ring 48 to a shoulder 64 that is substantially radially adjacent the annular, outwardly facing groove 54. The rearward or back end 66 of the molded ring may be formed with a rearwardly and axially extending cylindrical flange 68 that may be inserted and press-fit or otherwise fixed to the filter element 48. Upon insertion, a back face 70 of the molded ring 28 abuts a mating face 72 of the filter element. Flange 68 located to fit inside the filter element, but it will be understood that it could also be located so as to fit over the filter element or parallel flanges could be provided to fit both inside and outside the filter element. Flange 68 is located to fit inside the filter element, but it will be understood that it could also be located so as to fit over this filter element or parallel flanges could be provided to fit both inside and outside the filter element. In an alternative arrangement, the flange 68 could be omitted and back face 70 secured to face 72 by adhesive or other suitable means.

Figure 4:
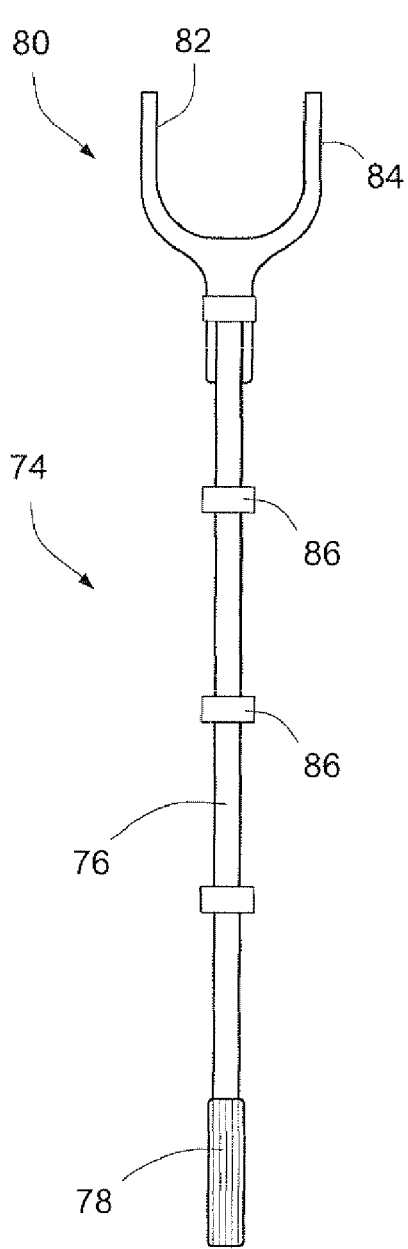
FIG. 4 is a bottom plan view of an installation tool for the filter element in accordance with an exemplary but nonlimiting embodiment of the invention.
Figure 5:
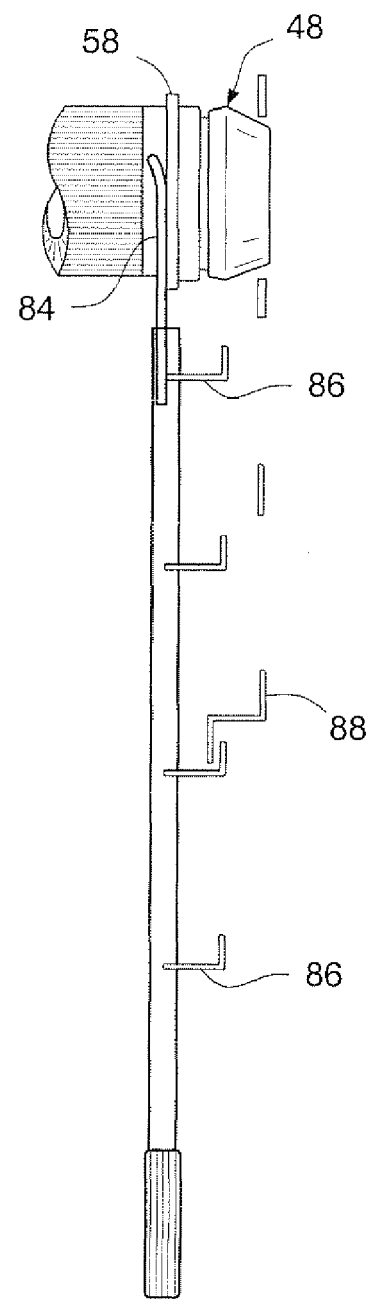
FIG. 5 is a side elevation of the tool shown in FIG. 4, but engaged with the snapband-type coupler on the filter element.

FIGS. 4 and 5 illustrate a filter assembly hand tool 74 that may be used to attach the filter 28 to the tube sheet 30. The tool 74 is provided with an elongated handle 76 that may have a conventional grip 78 telescoped over its distal end. The proximate or working end of the handle mounts a substantially U-shaped, open clevis-like tool head 80 (sometimes simply referred to as a "clevis" or "fork", recognizing that the conventional clevis pin is omitted), the substantially parallel ends 82, 84 of which may be slightly curved in an axial direction. It will be appreciated that the parallel ends or arms 82, 84 are spaced from each other sufficient to permit the arms to engage opposite sides of the groove 54. Right-angle latching brackets 86 may be secured at axially-spaced locations along the handle 76, and are selectively used to engage an appropriately located, cooperable latching edge 88 (shown schematically in FIG. 5) on the dust collector housing (for example, on an edge defining an opening that receives the side panel 18). Thus, as shown in FIG. 5, the clevis or fork 80 may be engaged behind the radial flange 58 on the molded ring 48 (with the opposite end of the filter element loosely supported in the grid 24), and one of the latching brackets 86 interengaged with a selected latching edge 88 on the housing. Using the engagement between the latching bracket 86 and latching edge 88 for leverage, the user may then pivot the tool 74 in a clockwise direction (as shown in FIG. 5), causing the free ends 82, 84 of the clevis 80 to push the molded ring 48 into the tube sheet aperture 38 until the ring groove 54 is snapped into place about the aperture edge 56. Note that the edges of the clevis ends 82, 84 facilitate the pivoting motion of the hand tool and prevent damage to the molded ring 48 as the clevis pivots in the direction shown in FIG. 5. This procedure is repeated for each filter element 28 loaded into the dust collector 10, noting that the user will select the most appropriately located latching bracket 86 along the tool handle 76 for each respective filter element 28. In the dust collector shown, fourteen filter elements 28 are utilized in an array of four horizontally-oriented rows, but other arrangements may be utilized.

To facilitate insertion, the tapered end portion 52 of the coupler ring 48 may be lubricated with any suitable lubricant, While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A horizontal dust collector comprising a plurality of elongated filter elements in a horizontally-oriented array, each filter element connected at one end to a tube sheet, and at an opposite end to a support plate; said one end of each filter element fitted with a substantially rigid coupler having an insertion portion, a peripheral, outwardly facing groove in which is received a mating edge defining an aperture in the tube sheet, and a radially outwardly extending flange located axially between said annular groove and said insertion portion, said flange adapted for engagement with a filter element installation tool.

2. The dust collector of claim 1 wherein said elongated filter elements are each substantially cylindrical in shape, and wherein said coupler includes a rearwardly extending cylindrical flange pressed into said one end of each of said filter elements.

3. The dust collector of claim 1 wherein said insertion portion is tapered inwardly in a direction of insertion into the tube sheet.

4. The dust collector of claim 3 wherein said insertion portion has a first internal diameter, and a remaining portion of said coupler adjacent said insertion portion has a second internal diameter less than said first internal diameter.

5. The dust collector of claim 4 wherein a radial shoulder separating said insertion portion and said remaining portion is located radially adjacent said peripheral outwardly facing groove.

6. The dust collector of claim 5 wherein said radial shoulder is substantially perpendicular to said insertion portion and said remaining portion.

7. The dust collector of claim 1 wherein said plurality of elongated filter elements comprise fourteen substantially cylindrical filters in an ordered array of four rows.

8. The dust collector of claim 1 wherein a back face of said coupler and a forward face of said filter element are adhesively secured together.

9. A filter element coupler for a filter in a horizontal dust collector comprising:
a coupler ring adapted to be mounted on one end of an elongated, substantially cylindrical filter element, said coupler ring having an insertion portion, a peripheral, outwardly facing groove adapted to receive a mating edge defining an aperture in a tube sheet, and a radially outwardly extending flange located axially between said annular groove and said insertion portion.

10. The filter element coupler of claim 9 wherein said insertion portion is tapered inwardly in a direction of insertion into the tube sheet.

11. The filter element coupler of claim 10 wherein said insertion portion has a first internal diameter, and a remaining portion of said coupler adjacent said insertion portion has a second internal diameter less than said first internal diameter.

12. The filter element coupler of claim 11 wherein a radial shoulder separating said first and second diameters is located radially adjacent said peripheral outwardly facing groove.

13. The filter element coupler of claim 9 in combination with an installation tool comprising an elongated handle and a substantially U-shaped clevis at a working end of the handle, said clevis including a pair of arms spaced to engage said coupler rearwardly of said radially outwardly extending flange.

* * * * *

UNITED STATES PATENT AND TRADEMARK OFFICE
CERTIFICATE OF CORRECTION

| | | |
|---|---|---|
| PATENT NO. | : 8,167,969 B2 | Page 1 of 1 |
| APPLICATION NO. | : 12/419741 | |
| DATED | : May 1, 2012 | |
| INVENTOR(S) | : Larry Dale McConnell | |

It is certified that error appears in the above-identified patent and that said Letters Patent is hereby corrected as shown below:

At column 3, lines 12-13, delete "...filter element 48. Upon insertion, a back face 70 of the molded ring 28" and insert --...filter element 28. Upon insertion, a back face 70 of the molded ring 48--

Signed and Sealed this
Tenth Day of July, 2012

David J. Kappos
*Director of the United States Patent and Trademark Office*